United States Patent
Fujiwara

(10) Patent No.: US 12,481,159 B2
(45) Date of Patent: Nov. 25, 2025

(54) CONTROL DEVICE, GLASSES-TYPE INFORMATION DISPLAY DEVICE, CONTROL METHOD, AND CONTROL PROGRAM

(71) Applicant: FUJIFILM Corporation, Tokyo (JP)

(72) Inventor: Shinya Fujiwara, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/360,412

(22) Filed: Jul. 27, 2023

(65) Prior Publication Data
US 2024/0036330 A1 Feb. 1, 2024

(30) Foreign Application Priority Data
Jul. 29, 2022 (JP) .................................. 2022-122238

(51) Int. Cl.
*G02B 27/01* (2006.01)
*G06F 3/01* (2006.01)
*G06V 10/25* (2022.01)
(52) U.S. Cl.
CPC ......... *G02B 27/0172* (2013.01); *G06F 3/013* (2013.01); *G06V 10/25* (2022.01); *G02B 2027/0178* (2013.01)
(58) Field of Classification Search
CPC ...... G02B 2027/014; G02B 2027/0187; G02B 27/017; G06T 11/00; G06T 15/40; G06T 19/006; G06F 3/011–013
See application file for complete search history.

(56) References Cited

U.S. PATENT DOCUMENTS

| | | | |
|---|---|---|---|
| 10,725,308 B1* | 7/2020 | Trail ....................... | G06F 3/012 |
| 11,768,376 B1* | 9/2023 | Pedder ............... | G02B 27/0179 |
| | | | 345/694 |
| 2016/0070101 A1* | 3/2016 | Nishizawa ............... | G09B 5/06 |
| | | | 345/8 |
| 2017/0277256 A1* | 9/2017 | Burns ..................... | G06F 3/013 |
| 2020/0285884 A1 | 9/2020 | Murata et al. | |
| 2020/0292825 A1* | 9/2020 | Grundhoefer ....... | G02B 27/0179 |
| 2021/0166661 A1 | 6/2021 | Wakabayashi | |
| 2021/0240260 A1* | 8/2021 | Ronkainen ............. | G06F 3/017 |
| 2022/0197377 A1 | 6/2022 | Kim et al. | |
| 2022/0207837 A1* | 6/2022 | Lee .................... | G02B 27/0093 |

FOREIGN PATENT DOCUMENTS

JP WO2019/123770 A1 6/2019

OTHER PUBLICATIONS

Extended European Search Report for European Application No. 23186789.6, dated Dec. 8, 2023.

* cited by examiner

*Primary Examiner* — Roberto W Flores
(74) *Attorney, Agent, or Firm* — Birch, Stewart, Kolasch & Birch, LLP

(57) ABSTRACT

A control device includes at least one processor, in which the processor acquires a region of interest of a user, performs, for at least one image of a real image visually recognized by the user through a transmission unit or a projected image projected onto the transmission unit and visually recognized by the user, a control to change visibility by the user based on a relationship between at least one of the real image or the projected image and the region of interest, by a visibility change unit that changes the visibility, and records the projected image in which the visibility is not changed by the visibility change unit.

16 Claims, 9 Drawing Sheets

CONTROL DEVICE, GLASSES-TYPE INFORMATION DISPLAY DEVICE, CONTROL METHOD, AND CONTROL PROGRAM

CROSS-REFERENCE TO RELATED APPLICATIONS

This application is based on and claims priority under 35 USC 119 from Japanese Patent Application No. 2022-122238, filed Jul. 29, 2022, the disclosure of which is incorporated herein by reference in their entirety.

TECHNICAL FIELD

The present disclosure relates to a control device, a glasses-type information display device, a control method, and a control program.

RELATED ART

A glasses-type information display device, such as an augmented reality (AR) device that displays a state in which an image is superimposed on a real world, is known in the related art as a display device that displays a three-dimensional video.

In a brain of a user who uses the glasses-type information display device, a real image in which the real world is visually recognized and a projected image in which a projection image is visually recognized are combined, so that the user can visually recognize a state where the projected image overlaps the real image.

A technique for changing the visibility of the real image and the projected image in the glasses-type information display device is known. For example, JP2019-123770A1 discloses a technique for changing a transparency of a virtual object in a display of an optically transmissive HMD in which a virtual object is superimposed and displayed in a real space based on a detection result in which a visual line of a user is detected

SUMMARY

By the way, in a case in which an image whose visibility is changed is recorded as visually recognized by the user, the image quality of the recorded image changes depending on whether the user sets the region of interest as a real image or a projection image. However, for an observer who observes the recorded image, the image quality may not be appropriate in some cases.

The present disclosure has been made in view of the above circumstances, and an object of the present disclosure is to provide a control device, a control method, and a control program capable of recording an image which is not affected by a region of interest of a user.

In order to achieve the above object, a control device of a first aspect of the present disclosure comprises at least one processor, in which the processor acquires a region of interest of a user, performs, for at least one image of a real image visually recognized by the user through a transmission unit or a projected image projected onto the transmission unit and visually recognized by the user, a control to change visibility by the user based on a relationship between at least one of the real image or the projected image and the region of interest, by a visibility change unit that changes the visibility, and records the projected image in which the visibility is not changed by the visibility change unit.

According to a control device of a second aspect of the present disclosure, in the control device of the first aspect, the processor performs a control to make visibility of one image of the real image and the projected image, which is the region of interest, relatively higher than visibility of the other image, which is not the region of interest.

According to a control device of a third aspect of the present disclosure, in the control device of the first aspect, the processor acquires a captured image that represents the real image, and records the captured image simulating the real image in a state in which the visibility is not changed by the visibility change unit.

According to a control device of a fourth aspect of the present disclosure, in the control device of the third aspect, the processor adds region-of-interest information related to the region of interest to the captured image and a projection image representing the projected image.

According to a control device of a fifth aspect of the present disclosure, in the control device of the first aspect, the processor acquires the region of interest detected based on a visual line of the user.

According to a control device of a sixth aspect of the present disclosure, in the control device of the fifth aspect, the region of interest is a region corresponding to a central visual field of the user.

According to a control device of a seventh aspect of the present disclosure, in the control device of the first aspect, the region of interest is a region where a gaze target of the user exists.

In order to achieve the above object, a glasses-type information display device of an eighth aspect of the present disclosure comprises a transmission unit, a visibility change unit, and the control device of the present disclosure.

In order to achieve the above object, a control method of a ninth aspect of the present disclosure comprises acquiring a region of interest of a user, performing, for at least one image of a real image visually recognized by the user through a transmission unit or a projected image projected onto the transmission unit and visually recognized by the user, a control to change visibility by the user based on a relationship between at least one of the real image or the projected image and the region of interest, by a visibility change unit that changes the visibility, and recording the projected image in which the visibility is not changed by the visibility change unit.

In order to achieve the above object, a control program of a tenth aspect of the present disclosure is a program for causing a processor to execute a process comprising acquiring a region of interest of a user, performing, for at least one image of a real image visually recognized by the user through a transmission unit or a projected image projected onto the transmission unit and visually recognized by the user, a control to change visibility by the user based on a relationship between at least one of the real image or the projected image and the region of interest, by a visibility change unit that changes the visibility, and recording the projected image in which the visibility is not changed by the visibility change unit.

According to the present disclosure, it is possible to record an image that is not affected by a region of interest of a user.

DETAILED DESCRIPTION

Hereinafter, examples of an embodiment for implementing the technology of the present disclosure will be described in detail with reference to the drawings.

Figure 1:
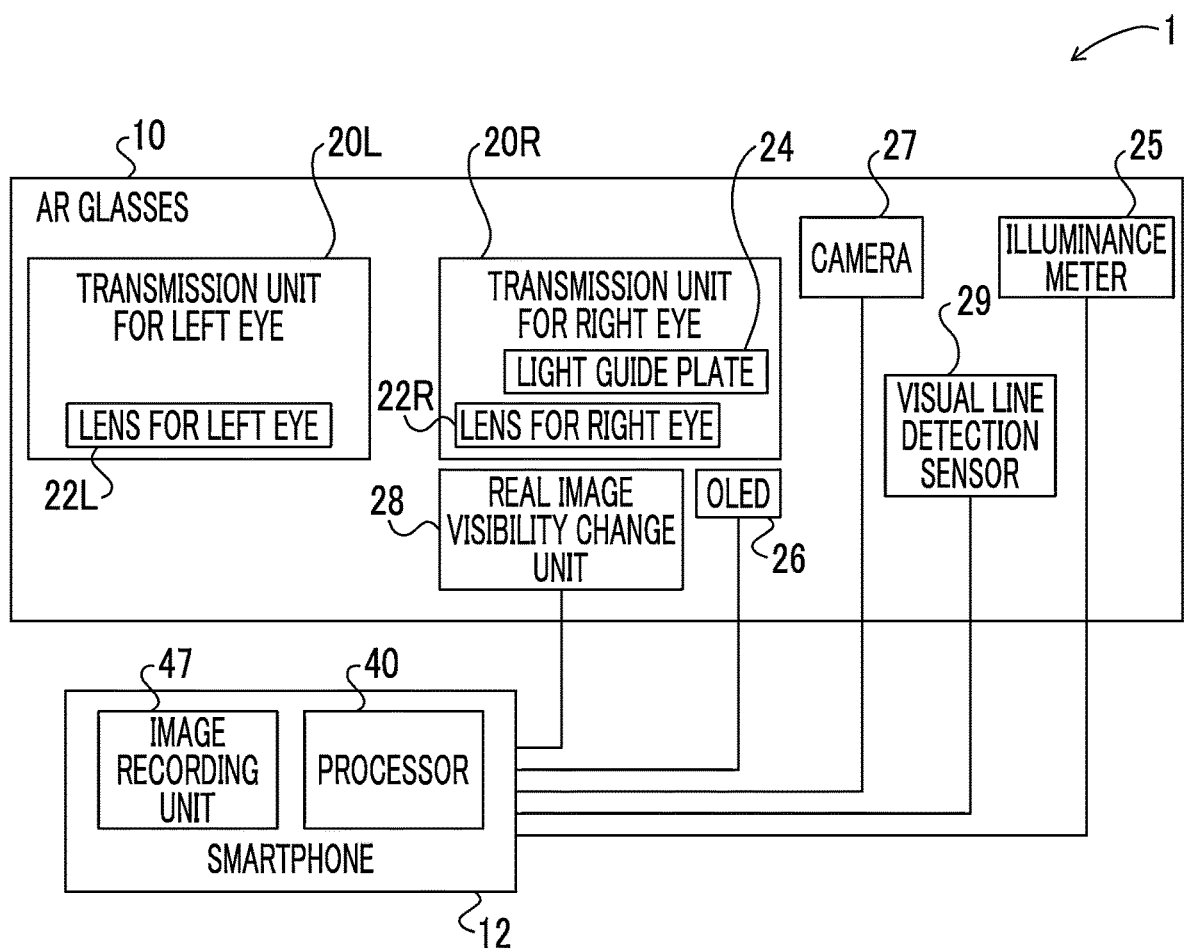
FIG. 1 is a configuration diagram showing an example of a configuration of a glasses-type information display device according to an embodiment.

The configuration of a glasses-type information display device 1 according to the present embodiment will be described with reference to FIG. 1. As shown in FIG. 1, the glasses-type information display device 1 according to the present embodiment comprises augmented reality (AR) glasses 10 and a smartphone 12.

Figure 2:
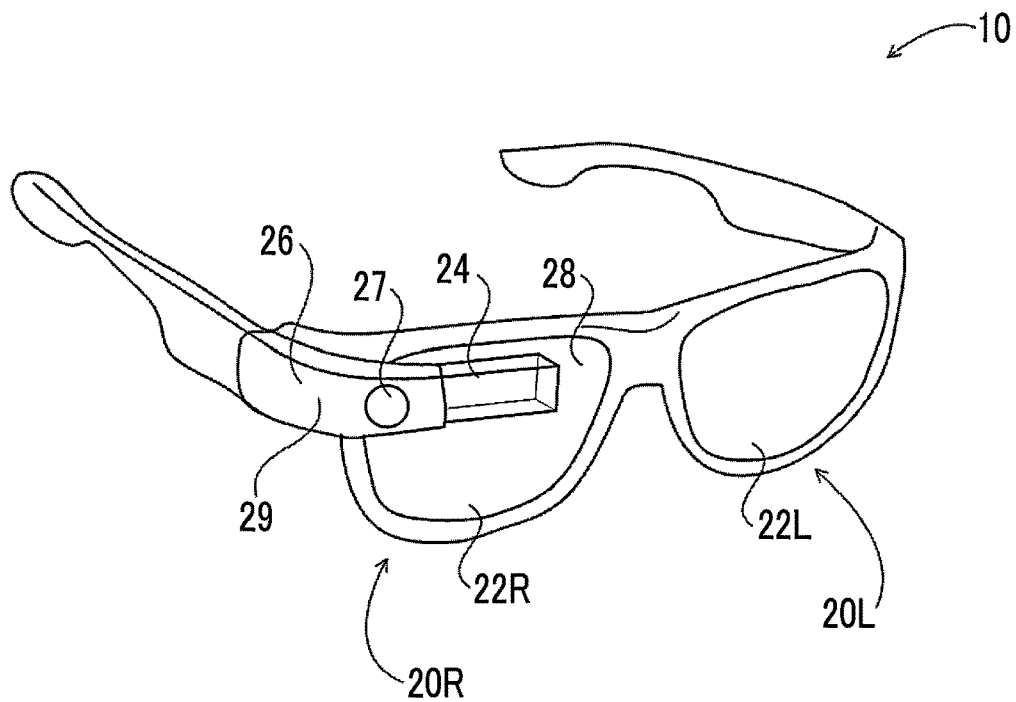
FIG. 2 is a perspective view showing an example of AR glasses according to the embodiment.

The AR glasses 10 are a device that allows a user to visually recognize a projection image, which is projected from an organic light emitting diode (OLED) 26, in a state in which the projection image is superimposed on a real image. FIG. 2 is a perspective view of an example of the AR glasses 10 of the present embodiment. As shown in FIGS. 1 and 2, the AR glasses 10 comprise a pair of a transmission unit 20L for a left eye and a transmission unit 20R for a right eye, an illuminance meter 25, an OLED 26, a camera 27, a real image visibility change unit 28, and visual line detection sensor 29. The transmission unit 20R for a right eye of the present embodiment is an example of the transmission unit of the present disclosure.

The OLED 26 projects an image (projection image), which represents information, onto the transmission unit 20R for a right eye in order to insert information into the visual field of a real image, which is visually recognized by the user through the transmission unit 20R for a right eye, in a superimposed manner.

The transmission unit 20R for a right eye includes a lens 22R for a right eye and a light guide plate 24. Light corresponding to the projection image projected from the OLED 26 is incident on one end of the light guide plate 24. The direction of light propagated through the light guide plate 24 is changed at an emission portion (not shown), and the light is emitted in a direction of the user's eye. The light, which is emitted from the light guide plate 24 and corresponds to the projection image, is transmitted through the lens 22R for a right eye, is guided to the right eye of the user, and is visually recognized as a projected image with the right eye. In addition, the user visually recognizes the real world, which is shown through the lens 22R for a right eye, as a real image with the right eye.

For this reason, while the projection image is projected from the OLED 26, the visually-recognized image visually recognized with the right eye of the user is in a state in which the projected image according to the projection image projected onto the light guide plate 24 is superimposed on the real image representing the real world shown through the lens 22R for a right eye. In addition, while the projection image is not projected from the OLED 26, the visually-recognized image visually recognized by the user is the real image that represents the real world shown through the lens 22R for a right eye and the light guide plate 24.

Meanwhile, the transmission unit 20L for a left eye includes a lens 22L for a left eye. The user visually recognizes the real world, which is shown through the lens 22L for a left eye, with the left eye.

The real image visibility change unit 28 changes the visibility of the real image visually recognized by the user shown through the lens 22R for a right eye in a case in which the OLED 26 projects the projection image onto the light guide plate 24. As an example, the real image visibility change unit 28 of the present embodiment changes the visibility of the entire lens 22R for a right eye by changing optical characteristics of the transmission unit 20R for a right eye. In addition, as an example in which the real image visibility change unit 28 of the present embodiment changes the optical characteristics of the transmission unit 20R for a right eye, the real image visibility change unit 28 adjusts a light shielding rate of the transmission unit 20R for a right eye, more specifically, the lens 22R for a right eye stepwise to reduce the visibility of the real image that is visually recognized with the right eye of the user stepwise. Examples of such a real image visibility change unit 28 include a liquid crystal shutter, electrochromism, a variable neutral density (ND) filter, and the like. The real image visibility change unit 28 of the present embodiment is an example of a visibility change unit of the present disclosure.

The camera 27 is a camera that images the real world observed by the user. Examples of the camera 27 include a digital camera such as a complementary metal oxide semiconductor (CMOS) camera. In the present embodiment, the camera 27 images the captured image equivalent to the real image visually recognized by the user, so that the camera 27 can image a color image. In addition, the camera 27 of the present embodiment is a camera using a so-called fisheye lens or a wide-angle lens, which can set a region equivalent to a range of the user's field of view as an imaging range. As described above, in the present embodiment, the imaging range of the camera 27 is set to be a region equivalent to the range of the user's field of view, but is not limited to this embodiment and the region may be wider or narrower than the range of the user's field of view. In order to provide the user with at least visual recognition of the real world, it is preferable that the imaging range of the camera 27 is equal to or greater than the range of the user's field of view. The image data of the captured image which is captured by the camera 27 is output to the smartphone 12. In the present embodiment, the "captured image" refers to an image captured by the camera 27.

The visual line detection sensor 29 is a sensor that detects a visual line of the user. As the visual line detection sensor 29, a known sensor can be applied, and examples thereof include a sensor that detects a visual line direction of the user based on a position of an iris or a pupil. As an example, the AR glasses 10 of the present embodiment detects the visual line of the right eye of the user. A detection result of the visual line detection sensor 29 is output to the smartphone 12.

The illuminance meter 25 is a sensor that detects illuminance as a brightness of the ambient light and as the brightness of the real world visually recognized by the user. The illuminance detected by the illuminance meter 25 is output to the smartphone 12.

On the other hand, the smartphone 12 comprises a processor 40 and an image recording unit 47. The processor 40 of the present embodiment controls the OLED 26 to project the projection image onto the light guide plate 24 from the OLED 26. In addition, the processor 40 controls the visibility of the real image and the visibility of the projected image. The smartphone 12 of the present embodiment is an example of an image processing device of the present disclosure.

The image recording unit 47 records captured images captured by the camera 27, projection images, and the like.

Figure 3:
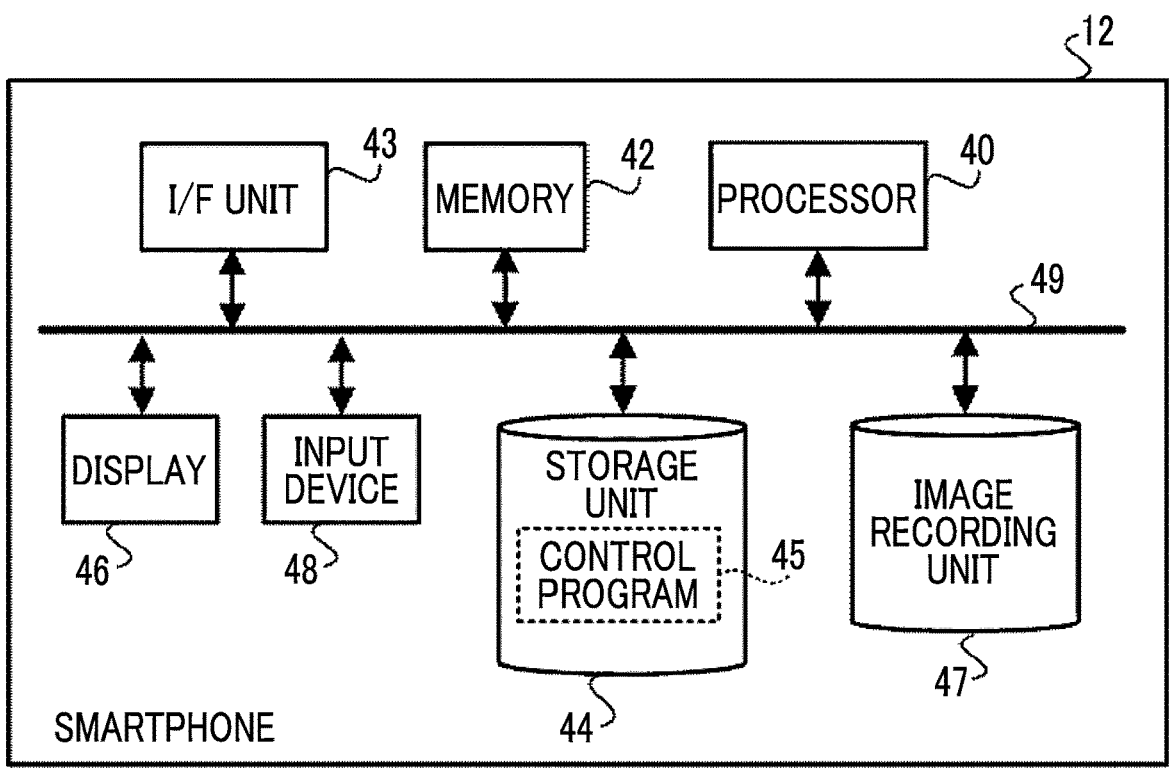
FIG. 3 is a block diagram showing an example of a configuration of a smartphone according to the embodiment.

FIG. 3 is a block diagram showing an example of a configuration of the smartphone 12 that is related to functions related to the control of the visibility of the real image and the control of the visibility of the projection image. As shown in FIG. 3, the smartphone 12 comprises a processor 40, a memory 42, an interface (I/F) unit 43, a storage unit 44, a display 46, an image recording unit 47, and an input device 48. The processor 40, the memory 42, the I/F unit 43, the storage unit 44, the display 46, the image recording unit 47, and the input device 48 are connected to each other via a bus 49, such as a system bus or a control bus, such that various types of information can be given and received therebetween.

The processor 40 reads out various programs, which include a control program 45 stored in the storage unit 44, to the memory 42 and performs processing corresponding to the program read out. Accordingly, the processor 40 controls the projection of the projection image that is performed by the OLED 26, and performs a control to cause the real image visibility change unit 28 to reduce visibility. The memory 42 is a work memory that is used in a case in which the processor 40 performs processing.

The control program 45, the image data (not shown) of the projection image projected from the OLED 26, various other types of information, and the like are stored in the storage unit 44. Specific examples of the storage unit 44 include a hard disk drive (HDD), a solid state drive (SSD), and the like.

The OF unit 43 communicates various types of information to each of the OLED 26 and the real image visibility change unit 28 using wireless communication or wired communication. The display 46 and the input device 48 function as a user interface. The display 46 provides various types of information, which is related to the projection of the projection image, to a user. The display 46 is not particularly limited, and examples of the display 46 include a liquid crystal monitor, a light emitting diode (LED) monitor, and the like. In addition, the input device 48 is operated by a user so that various instructions related to the projection of the projection image are input. The input device 48 is not particularly limited, and examples of the input device 48 include a keyboard, a touch pen, a mouse, and the like. A touch panel display in which the display 46 and the input device 48 are integrated with each other is employed in the smartphone 12.

In addition, the function of the smartphone 12 of the present embodiment will be described. The processor 40 of the smartphone 12 of the present embodiment has a function of performing a control to change the visibility of at least one image of the real image which is visually recognized by the user shown through the lens 22R for a right eye of the transmission unit 20R for a right eye or the projected image which is projected onto the light guide plate 24 of the transmission unit 20R for a right eye and is visually recognized by the user, based on the relationship with a region of interest. In addition, the smartphone 12 has a function of performing a control to cause the image recording unit 47 to record the projected image, which is not related to the change in visibility.

Here, a control for changing the visibility of the real image and the projection image will be described.

Figure 4:
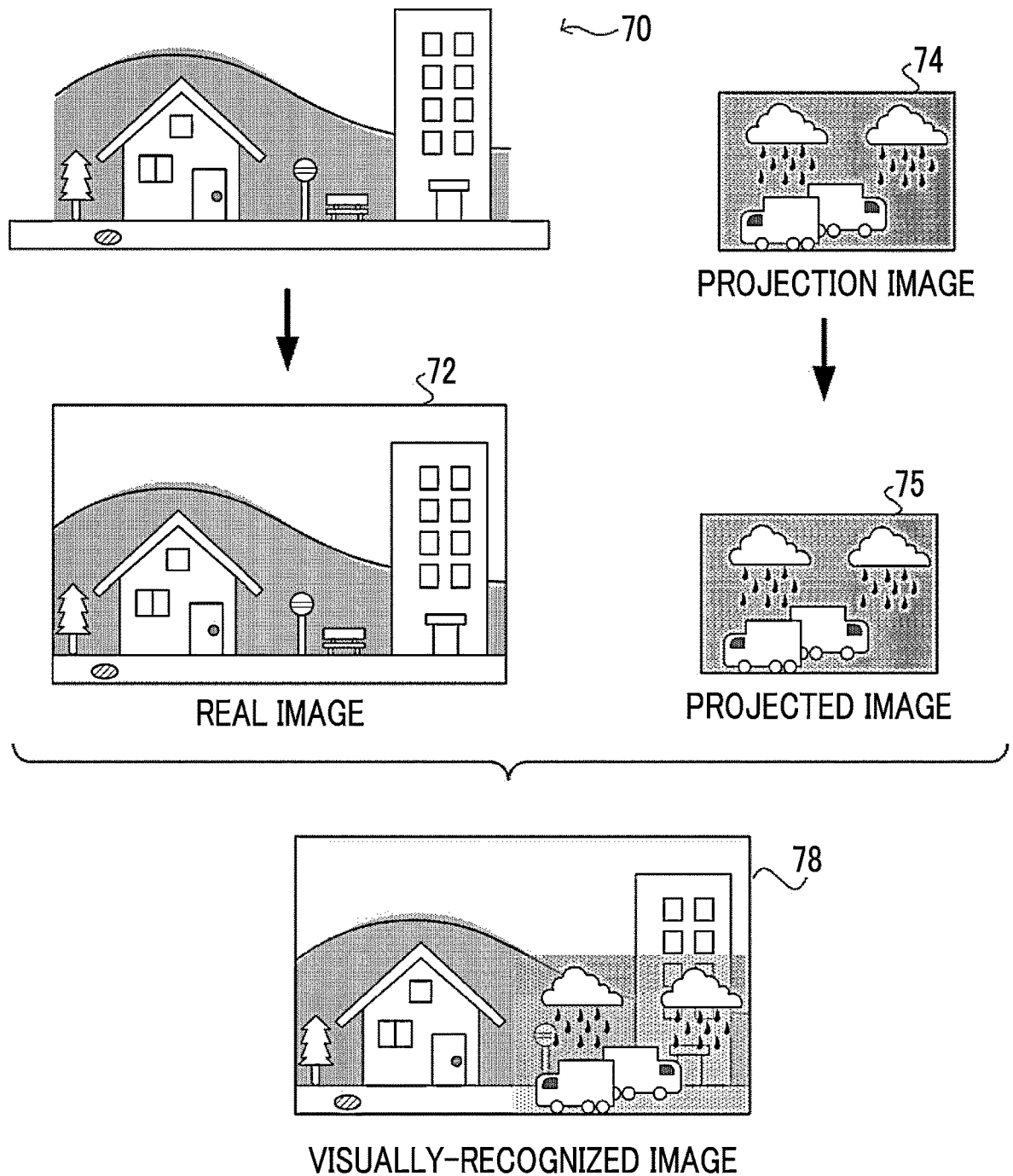
FIG. 4 is a diagram for explaining an image which is visually recognized by a user.

A state in which a user who uses the glasses-type information display device 1 visually recognizes a real world 70 will be described with reference to FIG. 4. As shown in FIG. 4, in a case in which the user visually recognizes the real world 70 in a state in which the projection image is not projected from the OLED 26, the user visually recognizes the real image 72.

In a case in which a projection image 74 is projected onto the light guide plate 24 from the OLED 26 in this state, as shown in FIG. 4, the user visually recognizes a projected image 75 corresponding to the projection image 74. Therefore, a visually-recognized image 78 visually recognized by the user is an image in which the real image 72 and the projected image 75 are superimposed.

Figure 5A:
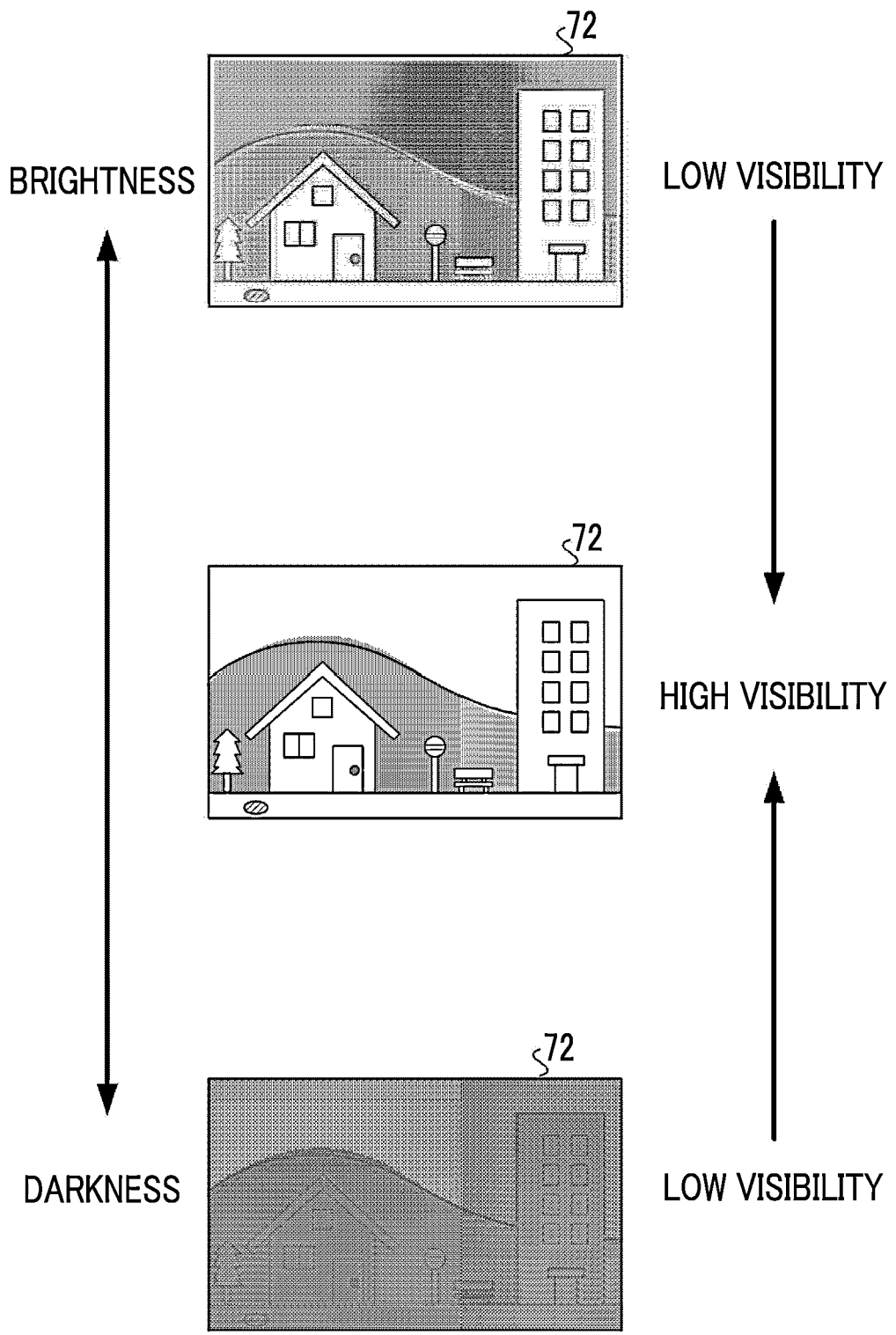
FIG. 5A is a diagram for explaining a change in visibility of a real image.

As for the real image 72, as shown in FIG. 5A, in a case in which the real world 70 is too bright, that is, in a case in which the real world 70 is dazzling, the real image 72 is too bright and the visibility of the real image 72 is reduced. For this reason, in a case in which the real world 70 is too bright, the visibility of the real image 72 can be improved by darkening the real image 72. In the present embodiment, in a case in which the illuminance (hereinafter, simply referred to as the illuminance of the real world 70), which is the detection result of detecting the brightness of the real world 70 by the illuminance meter 25, is equal to or greater than a threshold value, it is determined that the brightness of the real world 70 is too bright, and the visibility of the real image 72 is improved by increasing the light shielding rate of the lens 22R for a right eye by the real image visibility change unit 28.

On the other hand, in a case in which the real world 70 is too dark, the real image 72 is too dark and the visibility of the real image 72 is reduced. For this reason, in a case in which the real world 70 is too dark, the visibility of the real image 72 can be improved by making the real image 72 relatively brighter than the projected image 75. In the present embodiment, in a case in which the illuminance of the real world 70 is less than the threshold value and it is determined that the brightness of the real world 70 is too dark, the brightness of the projected image 75 is reduced to darken the projected image 75 by making a brightness value of the projection image 74 smaller than a predetermined value. Accordingly, the visibility of the real image 72 can be improved by making the real image 72 relatively brighter than the projected image 75.

Figure 5B:
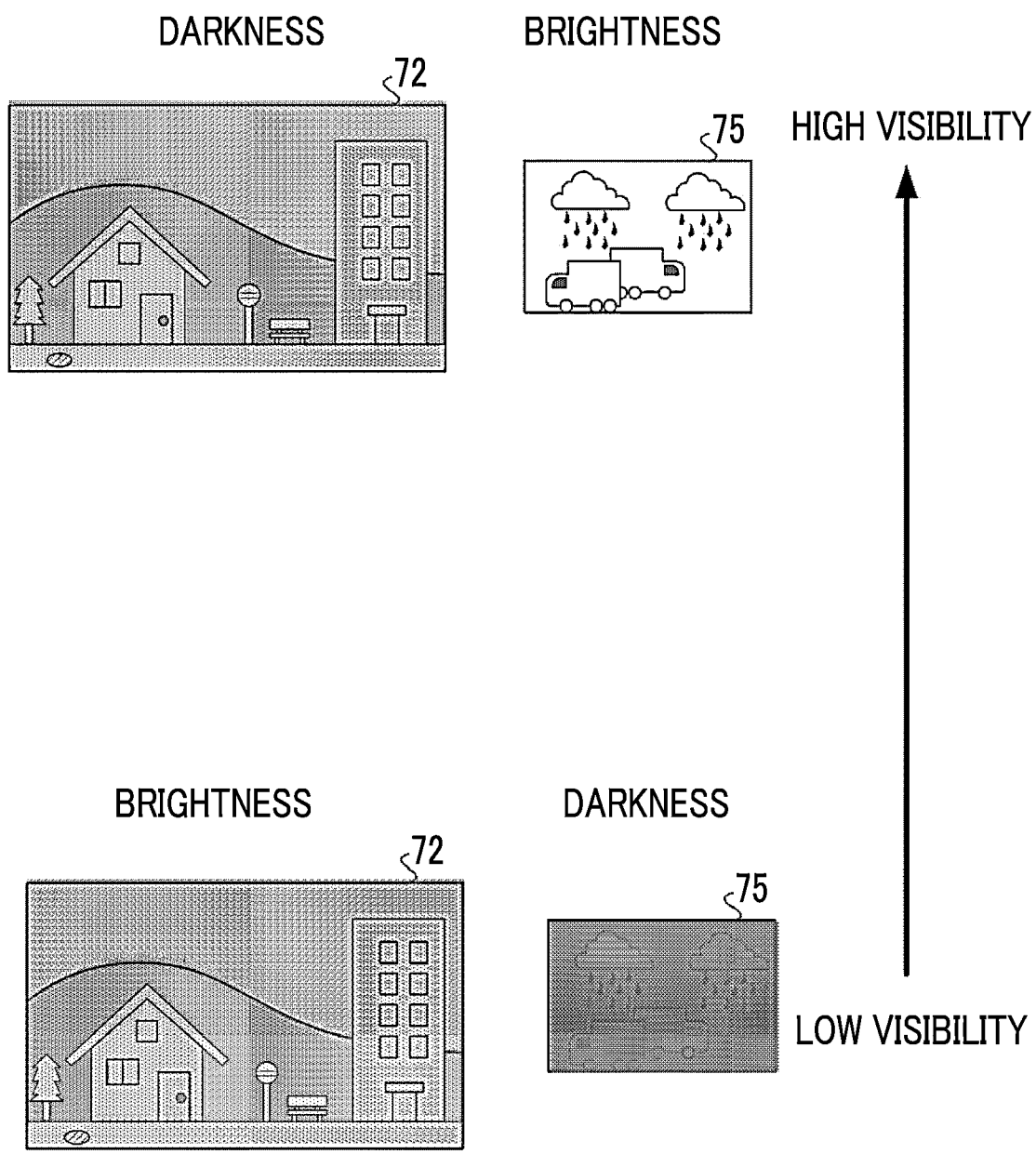
FIG. 5B is a diagram for explaining a change in visibility of a projected image.

On the other hand, as shown in FIG. 5B, the visibility of the projection image 74 can be improved by making the projection image 74 relatively brighter than the real image 72. In the present embodiment, the brightness value of the projection image 74 is made larger than the predetermined value, so that the brightness of the projected image 75 is increased to brighten the projected image 75. Accordingly, the visibility of the projected image 75 can be improved by making the projected image 75 relatively brighter than the real image 72.

In the present embodiment, the processor 40 acquires, based on whether the user visually recognizes the real image 72 or the projection image 74 based on the detection result of the visual line detection sensor 29, one image whose the user visually recognizes among the real image 72 and the projected image 75, as a region of interest. Then, the control is performed such that the visibility of an image that is the region of interest among the real image 72 and the projected image 75 is made relatively higher than the visibility of an image that is not the region of interest.

Figure 6:
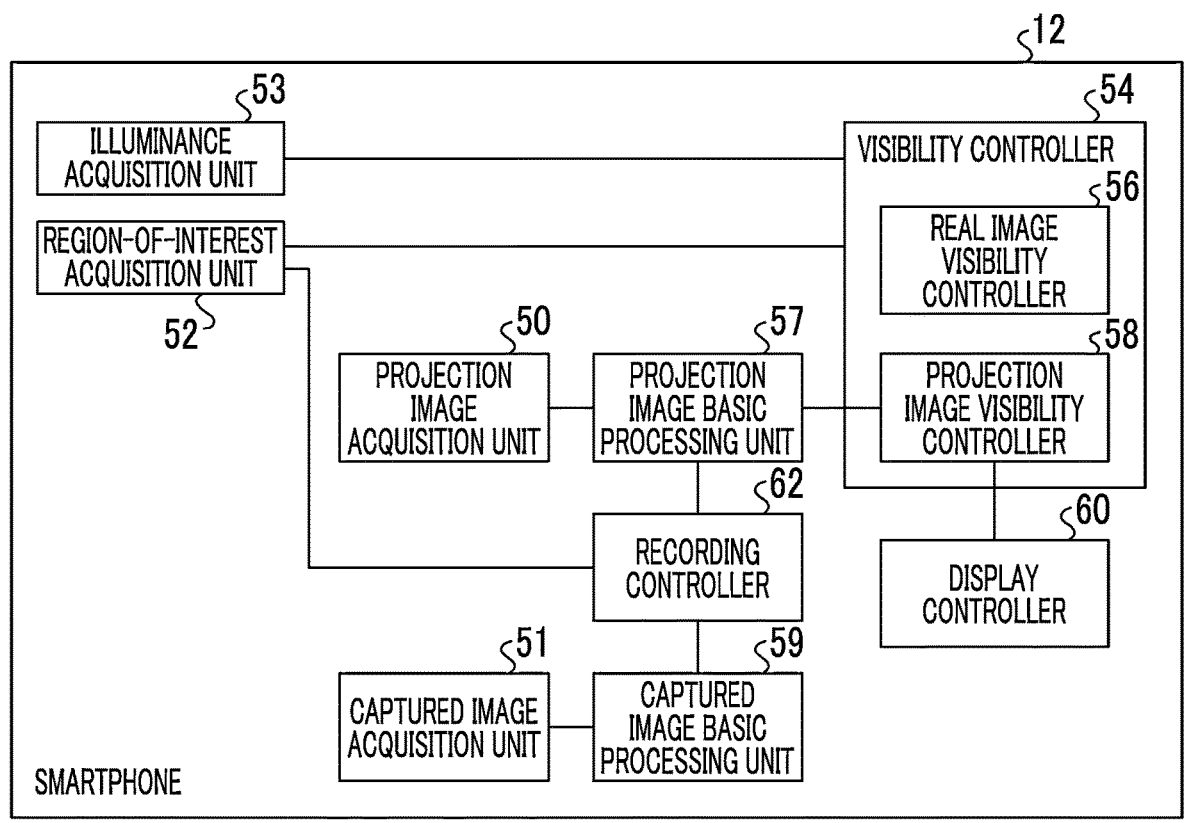
FIG. 6 is a block diagram showing an example of a hardware configuration of the smartphone according to the embodiment.

FIG. 6 is a functional block diagram showing an example of a configuration related to the function of the smartphone 12 of the present embodiment. As shown in FIG. 6, the smartphone 12 comprises a projection image acquisition unit 50, a captured image acquisition unit 51, a region-of-interest acquisition unit 52, an illuminance acquisition unit 53, a visibility controller 54, a projection image basic processing unit 57, a captured image basic processing unit 59, a display controller 60, and a recording controller 62. As an example, in the smartphone 12 of the present embodiment, the processor 40 executes the control program 45 stored in the storage unit 44, so that the processor 40 functions as the projection image acquisition unit 50, the captured image acquisition unit 51, the region-of-interest acquisition unit 52, the illuminance acquisition unit 53, the visibility controller 54, the projection image basic processing unit 57, the captured image basic processing unit 59, the display controller 60, and the recording controller 62.

The projection image acquisition unit 50 has a function of acquiring image data of the projection image projected by the OLED 26. In the present embodiment, as an example, since the image data of the projection image is stored in the storage unit 44, the projection image acquisition unit 50 acquires the image data of the projection image from the storage unit 44. Regardless of the present embodiment, image data of the projection image may be acquired from an external device of the smartphone 12 via the OF unit 43. The projection image acquisition unit 50 outputs the image data of the projection image to the projection image basic processing unit 57. Hereinafter, the image data of the projection image is simply referred to as the projection image, and for example, acquiring the image data of the projection image is referred to as acquiring the projection image.

The captured image acquisition unit 51 has a function of acquiring image data of a captured image obtained by imaging the real world 70 with the camera 27. The image data of the captured image acquired by the captured image acquisition unit 51 is output to the captured image basic processing unit 59. Hereinafter, the image data of the captured image is simply referred to as a captured image, and for example, acquiring the image data of the captured image is referred to as acquiring the captured image.

The region-of-interest acquisition unit 52 acquires the region of interest based on the detection result of the visual line detection sensor 29. Specifically, the region-of-interest acquisition unit 52 acquires the real image 72 as the region of interest in a case in which the detection result of the visual line detection sensor 29 is a detection result in which the visual line is directed to the real image 72. On the other hand, the region-of-interest acquisition unit 52 acquires the projected image 75 as the region of interest in a case in which the detection result of the visual line detection sensor 29 is a detection result in which the visual line is directed to the projected image 75. The region-of-interest acquisition unit 52 outputs information indicating whether the region of interest is the real image 72 or the projected image to the visibility controller 54 and the recording controller 62.

The illuminance acquisition unit 53 has a function of acquiring the illuminance detected by the illuminance meter 25. That is, the illuminance acquisition unit 53 of the present embodiment has a function of acquiring illuminance representing the brightness of the real world 70 as described above. The illuminance acquisition unit 53 outputs information indicating the acquired illuminance to the visibility controller 54.

The projection image basic processing unit 57 has a function of performing basic image processing predetermined for a projection image regardless of a change in visibility by the visibility controller 54 on the projection image 74. Examples of basic image processing for a projection image include noise removal processing or the like. The projection image basic processing unit 57 outputs the projection image 74, which has undergone basic image processing for a projection image, to the projection image visibility controller 58 and the recording controller 62. In a case in which the projection image 74, which has undergone basic image processing for a projection image by the projection image basic processing unit 57, is distinguished from other projection images 74 such as the projection image 74 before the image processing, it is referred to as the projection image 74 after the basic image processing.

The visibility controller 54 includes a real image visibility controller 56 and a projection image visibility controller 58.

The visibility controller 54 has a function of performing a control to change the visibility based on the relationship between at least one of the real image 72 or the projected image 75 and the region of interest.

In a case in which the region of interest is the real image 72, the visibility controller 54 performs a control to make the visibility of the real image 72 relatively higher than the visibility of the projected image 75. In a case of improving the visibility of the real image 72 and in a case in which the illuminance acquired by the illuminance acquisition unit 53 is equal to or greater than the threshold value, the real image visibility controller 56 performs a control to improve the visibility of the real image 72 by the real image visibility change unit 28. The real image visibility controller 56 of the present embodiment instructs the real image visibility change unit 28 such that the light shielding rate of the lens 22R for a right eye is a light shielding rate determined by the visibility controller 54. The real image visibility change unit 28 improves the visibility of the real image 72 visually recognized by the user by setting a light shielding rate to the instructed light shielding rate in response to the instruction output from the smartphone 12.

In addition, in a case of improving the visibility of the real image 72 and in a case in which the illuminance acquired by the illuminance acquisition unit 53 is less than the threshold value, the projection image visibility controller 58 performs a control to reduce the visibility of the projected image 75 by reducing the brightness value of the projection image 74 after the basic image processing to make it darker. The projection image visibility controller 58 of the present embodiment improves the visibility of the real image 72 relatively by reducing the visibility of the projected image 75. The projection image visibility controller 58 outputs the projection image 74 after the basic image processing with reduced brightness value to the display controller 60.

On the other hand, in a case in which the region of interest is the projected image 75, the visibility controller 54 performs a control to make the visibility of the projected image 75 relatively higher than the visibility of the real image 72. In a case of improving the visibility of the projected image 75, the projection image visibility controller 58 performs a control to improve the visibility of the projected image 75 by increasing the brightness value of the projection image 74 after the basic image processing to make it brighter. The projection image visibility controller 58 outputs the projection image 74 after the basic image processing with increased brightness value to the display controller 60.

That is, in a case in which the visibility of the projected image 75 is not changed, the projection image visibility controller 58 outputs the projection image 74 after the basic image processing to the display controller 60. On the other hand, in a case in which the visibility of the projected image 75 is changed, the projection image visibility controller 58 outputs the projection image 74 after the basic image processing in which the brightness value is increased or reduced by the projection image visibility controller 58 to the display controller 60.

In addition, the captured image basic processing unit 59 has a function of generating an image simulating the real image 72 by performing basic image processing for a captured image on the captured image. Examples of basic image processing for a captured image include image processing, noise removal processing, and the like, which are generally performed in imaging with a digital camera. The captured image processing unit 64 outputs the captured image that has undergone the basic image processing for a captured image to the recording controller 62. In a case in which the captured image, which has undergone basic image processing for a captured image by the captured image basic processing unit 59, is distinguished from other captured images before the image processing, it is referred to as the captured image after the basic image processing.

Figure 7:
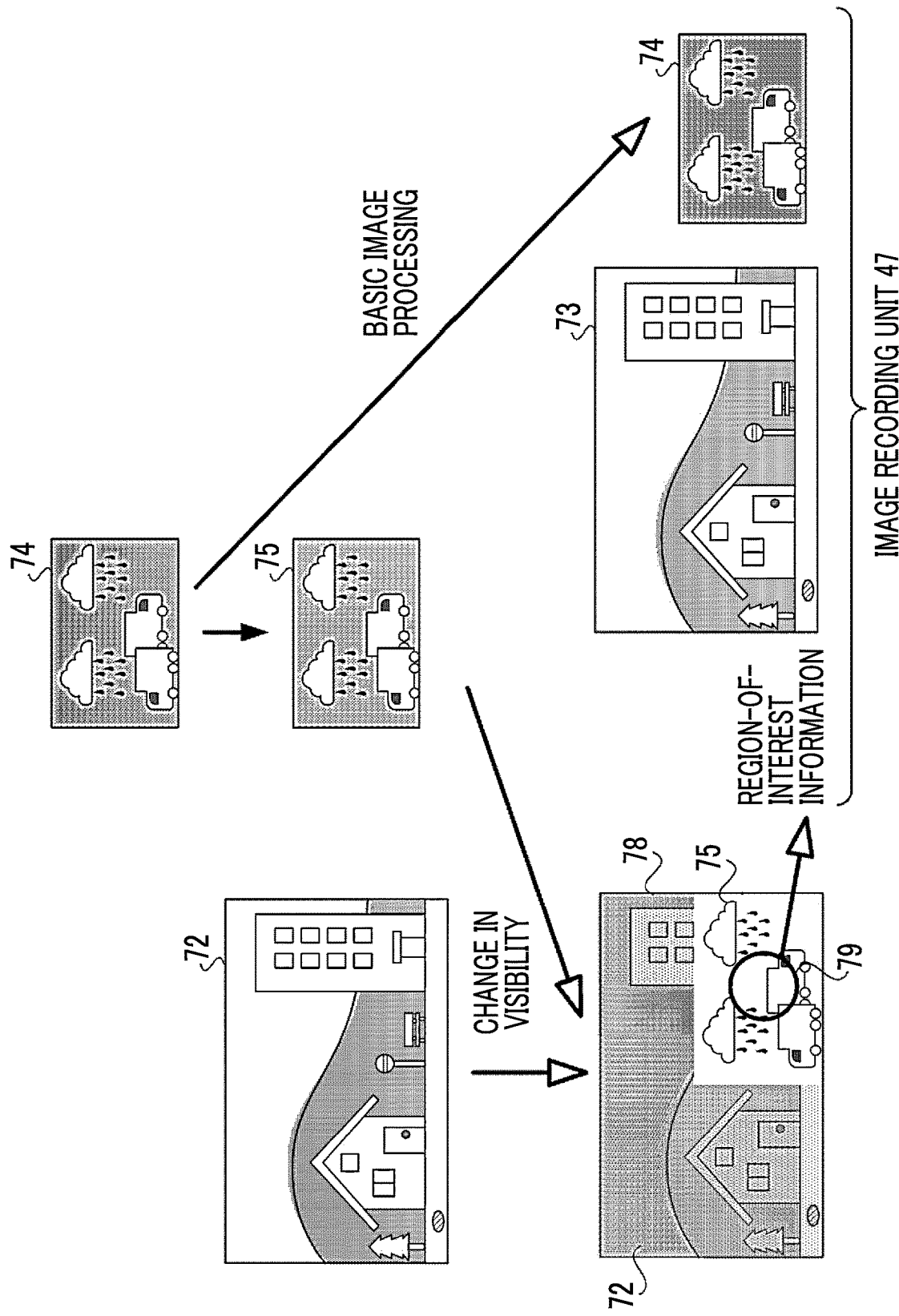
FIG. 7 is a diagram for explaining a real image and a projected image with changed visibility, and a captured image and a projection image recorded in an image recording unit.

The recording controller 62 has a function of performing a control to cause the image recording unit 47 to record the projection image 74 after the basic image processing and the captured image after the basic image processing in association with region-of-interest information indicating the region of interest. FIG. 7 shows a relationship between the visually-recognized image 78 which is visually recognized through the AR glasses 10 by the user, and the projection image 74 and the captured image which are recorded in the image recording unit 47 in the glasses-type information display device 1 of the present embodiment. FIG. 7 shows a case where the region of interest 79 is the projection image 75. In this case, the user visually recognizes the visually-recognized image 78 in which the visibility of the projected image 75 is relatively higher than the visibility of the real image 72 through the AR glasses 10. On the other hand, the projection image 74 after the basic image processing and the captured image 73 after the basic image processing are stored in the image recording unit 47 in a state where the region-of-interest information indicating that the region of interest 79 is the projected image 75 is added thereto.

Figure 8:
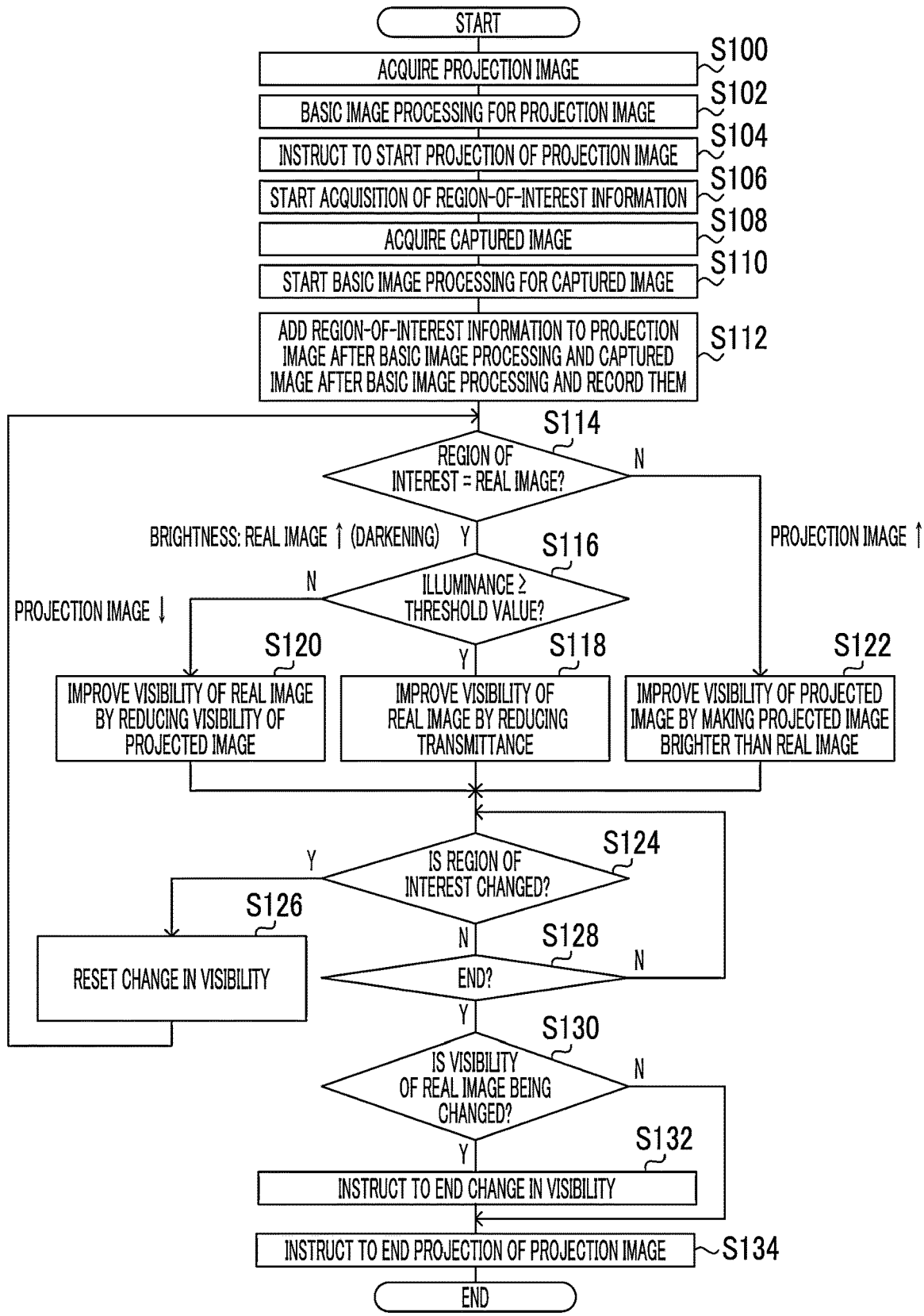
FIG. 8 is a flowchart showing an example of control processing executed by the smartphone according to the embodiment.

Next, the action of the smartphone 12 of the present embodiment will be described. FIG. 8 shows a flowchart showing an example of the flow of control processing that is performed by the processor 40 of the smartphone 12 of the present embodiment. For example, in the smartphone 12 of the present embodiment, the processor 40 executes the control program 45 stored in the storage unit 44 to perform the control processing of which an example is shown in FIG. 8 in a case in which an instruction to start projection, which is input using the input device 48 by a user, is received. The user visually recognizes the real world 70, that is, the real image 72 with both the left and right eyes through the transmission unit 20L for a left eye and the transmission unit 20R for a right eye at a point of time when the control processing shown in FIG. 8 is started.

In Step S100 of FIG. 8, the projection image acquisition unit 50 acquires the projection image 74. In the present embodiment, the image data of the projection image 74 is acquired from the storage unit 44 as described above.

In the next step S102, the projection image basic processing unit 57 performs basic image processing for the projection image 74 as described above, and generates the projection image 74 after the basic image processing which is not related to any of the change in the visibility of the real image 72 and the change in the visibility of the projected image 75.

In the next step S104, the display controller 60 outputs the image data of the projection image 74 and a start instruction to start projection to the OLED 26 so that the projection image 74 after the basic image processing is projected onto the light guide plate 24. In a case in which the image data of the projection image 74 and the start instruction to start projection are input to the OLED 26 from the smartphone 12, the OLED 26 projects the projection image 74 after the basic image processing output from the projection image basic processing unit 57 onto the light guide plate 24.

As a result, the user visually recognizes the projected image 75 corresponding to the projection image 74 after the basic image processing.

Therefore, the user visually recognizes the real image 72 on which the projected image 75 is superimposed, and focuses the visual line on either the real image 72 or the projected image 75.

In the next step S106, the region-of-interest acquisition unit 52 starts acquiring the region-of-interest information, which indicates the region of interest, based on the detection result of the visual line detection sensor 29.

In the next step S108, as described above, the captured image acquisition unit 51 acquires the captured image from the camera 27.

In the next step S110, the captured image basic processing unit 59 performs basic image processing for the captured image as described above, and generates the captured image after the basic image processing which is not related to any of the change in the visibility of the real image 72 and the change in the visibility of the projected image 75.

In the next step S112, as described above, the recording controller 62 adds the region-of-interest information, which indicates the region of interest, acquired in Step S106 to the projection image 74 after the basic image processing generated in Step S102 and the captured image after the basic image processing generated in Step S110 and records them to the image recording unit 47.

Accordingly, the image recording unit 47 records the captured image and the projection image 74 that do not depend on changes in the visibility of the real image 72 and the projected image 75. In other words, the captured image and the projection image 74 are recorded in the image recording unit 47 regardless of whether the user of the AR glasses 10 is interested in the real image 72 or the projected image 75.

In the next step S114, the visibility controller 54 determines whether or not the region of interest is the real image 72. In a case in which the region of interest is the real image 72, the processing in Step S114 is an affirmative determination, and the processing proceeds to Step S116.

In Step S116, as described above, the real image visibility controller 56 determines whether or not the illuminance acquired by the illuminance acquisition unit 53 is equal to or greater than the threshold value. In a case in which the acquired illuminance is equal to or greater than the threshold value, that is, in a case in which the real world 70 is bright, the determination in Step S116 is an affirmative determination, and the processing proceeds to Step S118.

In Step S118, as described above, the real image visibility controller 56 improves the visibility of the real image 72 by darkening the brightness of the real image 72. Specifically, an instruction is output to the real image visibility change unit 28 to reduce the brightness of the real image 72 by the predetermined amount of reduction. In a case in which an instruction is input from the smartphone 12, the real image visibility change unit 28 reduces a transmittance of the transmission unit 20R for a right eye by the instructed amount of reduction to shield the light. Accordingly, the user can easily see the real image 72, thereby the visibility of the real image 72 is improved.

On the other hand, in a case in which the illuminance is less than the threshold value in Step S116, that is, in a case in which the real world 70 is dark, the determination in Step S116 is a negative determination, and the processing proceeds to Step S120. In Step S120, as described above, the projection image visibility controller 58 improves the visibility of the real image 72 by darkening the brightness of the projection image 74. Specifically, by reducing the brightness value of the projection image 74 by a predetermined amount, the projection image 74 is darkened, so that the projected image 75 is darkened and the real image 72 is relatively brightened. Accordingly, the user can easily see the real image 72, thereby the visibility of the real image 72 is improved.

On the other hand, in a case in which the region of interest is not the real image 72, in other words, in a case in which the region of interest is the projected image 75, the processing in Step S114 is a negative determination, and the processing proceeds to Step S122. In Step S122, as described above, the projection image visibility controller 58 improves the visibility of the projected image 75. Specifically, by increasing the brightness value of the projection image 74 by a predetermined amount, the projection image 74 is brightened to make the projected image 75 relatively brighter than the real image 72. Accordingly, the user can easily see the projected image 75, thereby the visibility of the projected image 75 is improved.

In a case in which the processing of Step S118, S120, or S122 ends, the processing proceeds to Step S124.

In Step S124, the region-of-interest acquisition unit 52 determines whether or not the region of interest is changed. In a case in which the region of interest is changed, the determination in Step S124 is an affirmative determination, and the processing proceeds to Step S126. In Step S126, the visibility controller 54 resets the change in visibility of the real image 72 or the projected image 75 that is currently being performed. That is, the visibility of the real image 72 and the projected image 75 is not changed. After Step S126, the processing returns to Step S114 and the processing of Steps S114 to S124 is repeated. On the other hand, in a case in which the region of interest is not changed, the determination in Step S124 is a negative determination, and the processing proceeds to Step S128.

In Step S128, the display controller 60 determines whether or not to end projection of the projection image 74. As an example, in the present embodiment, in a case in which an instruction to end projection, which is input using the input device 48 by the user, is received, the projection of the projection image 74 ends. Accordingly, in a case in which an instruction to end the projection of the projection image 74 is not received, the determination in Step S128 is a negative determination, and the processing returns to Step S124. On the other hand, in a case in which an instruction to end the projection of the projection image 74 is received, the determination in Step S128 is an affirmative determination, and the processing proceeds to step S130.

In Step S130, the visibility controller 54 determines whether or not the visibility of the real image 72 is being changed by the real image visibility change unit 28. In a case in which the visibility of the real image 72 is not being changed, the determination in Step S130 is a negative determination, and the processing proceeds to Step S134. On the other hand, in a case in which the visibility of the real image 72 is being changed, the determination in Step S130 is an affirmative determination, and the processing proceeds to Step S132.

In Step S132, the real image visibility controller 56 of the visibility controller 54 outputs an end instruction to the real image visibility change unit 28 so that the change in the visibility of the real image 72 ends. In a case in which the end instruction is input to the real image visibility change unit 28 from the smartphone 12, the real image visibility change unit 28 ends the shielding of the transmission unit 20R for a right eye from light. This returns to the state before the visibility of the real image 72 is changed.

In the next step S134, the display controller 60 outputs an end instruction to the OLED 26 so that the projection of the projection image 74 ends. In a case in which the end instruction is input to the OLED 26 from the smartphone 12, the OLED 26 ends the projection of the projection image. In a case in which the processing of Step S134 ends, the image processing shown in FIG. 8 ends.

In this way, according to the smartphone 12, even in a case in which the visibility of the real image 72 and the projected image 75 is changed, the captured image and the projection image 74 simulating the real image 72, which is not related to the change in the visibility, are recorded in the image recording unit 47. Therefore, according to the smartphone 12 of the present embodiment, it is possible to record an image that is not affected by the region of interest of the user. Accordingly, the observer who observes the captured image and the projection image 74 recorded in the image recording unit 47 can observe an image that is not affected by which region of interest the user of the glasses-type information display device 1 is in. In addition, since the recorded captured image and the projection image 74 are associated with information indicating the region of interest, the visibility controller 54 can generate an image simulating the visually-recognized image 78 visually recognized by the user of the AR glasses 10. In such a case of generating the image simulating the visually-recognized image 78 as described above, it is preferable that the illuminance acquired from the illuminance meter 25 is also recorded in association with the image.

An aspect in which the image recording unit 47 records the projection image 74 (the projection image 74 after basic image processing) and the captured image (the captured image after basic image processing) with the region-of-interest information added thereto has been described in the above-mentioned embodiment, but these destinations of the record are not limited to the image recording unit 47. For example, in a device external to the glasses-type information display device 1, the projection image 74 (the projection image 74 after basic image processing) and the captured image (the captured image after basic image processing) with the region-of-interest information added thereto may be recorded.

In addition, in the above-mentioned embodiment, the visibility of either the real image 72 or the projected image 75 is changed, but the visibility of both the real image 72 and the projected image 75 may be changed. For example, in a case in which the visibility of the real image 72 is improved, the visibility of the real image 72 may be improved and the visibility of the projected image 75 may be reduced.

Figure 9:
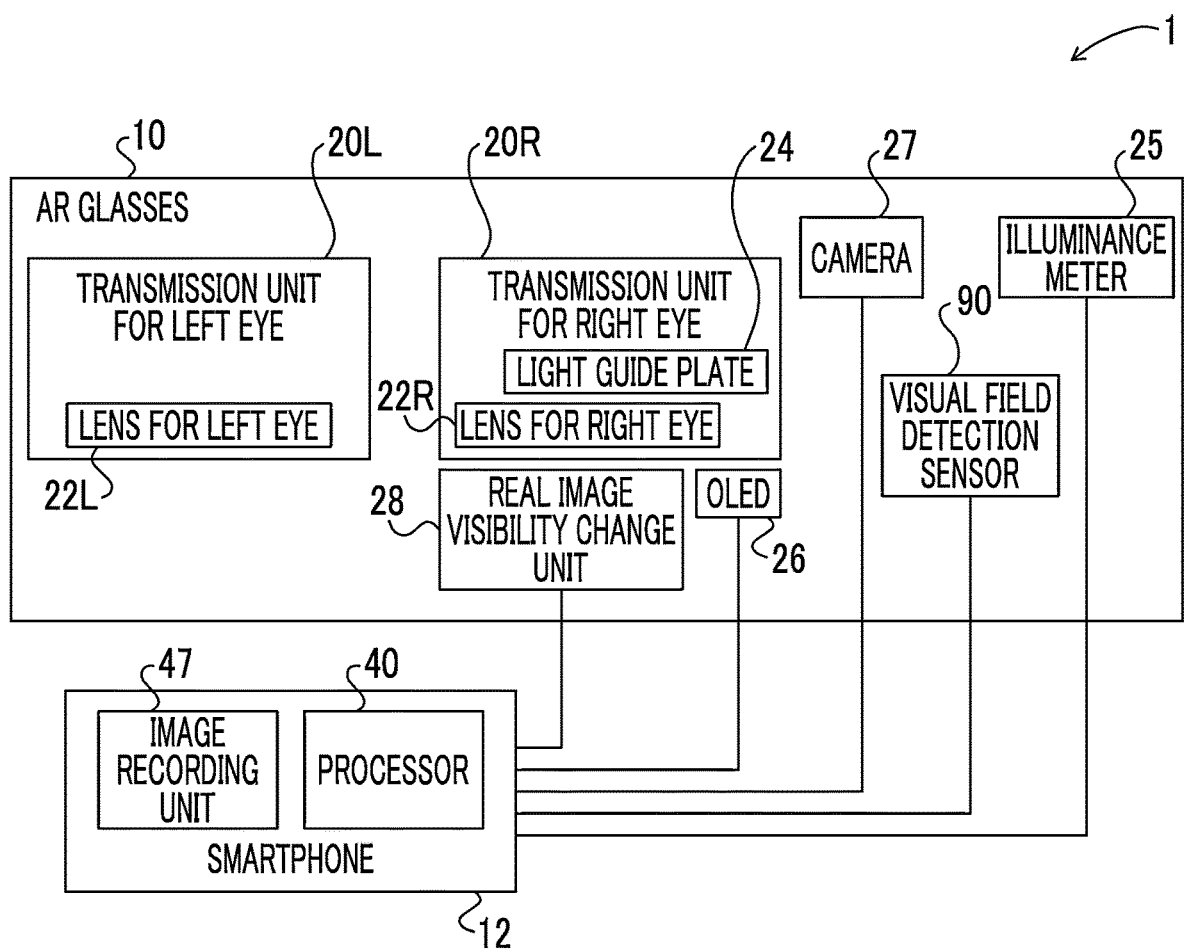
FIG. 9 is a block diagram showing another example of the configuration of the smartphone according to the embodiment.

The method for detecting the region of interest is not limited to the above-mentioned embodiment. For example, as shown in FIG. 9, a visual field detection sensor 90 may be comprised instead of the visual line detection sensor 29. In a case of visually recognizing an object, it can be said the more the object exists in the center of the visual field of the user (central visual field), the more the object is a gaze target that the user is gazing at and showing interest in. Therefore, the visual field detection sensor may detect the visual field of the user and detect the image existing in the central visual field among the real image 72 and the projection image 74 as the image corresponding to the region of interest. Examples of the visual field detection sensor 90 in this case include, for example, a camera that images the user's eye, and the central visual field may be detected by detecting the position of the pupil of the user from the captured image captured by the camera.

In addition, for example, the smartphone 12 may receive the gaze target that is designated by the user. In this case, the region in which the gaze target designated by the user exists is the region of interest. In addition, for example, the smartphone 12 may estimate the user's interest from the Internet browsing history and the smartphone 12 may estimate the region of interest based on the estimated interest.

In addition, an aspect in which the AR glasses 10 is applied as an example of the glasses-type information display device according to the embodiment of the present disclosure in the above-mentioned embodiment, but the glasses-type information display device is not limited to the AR glasses 10, and can be applied to various forms such as a head-mounted display.

In addition, the word "glasses" in the "glasses-type information display device" functionally means implementing a first sensor (human eyes) that acquires an image and a second sensor (camera 27 of AR glasses 10) that includes the visual field of the first sensor and that acquires a captured image in substantially the same visual line direction as the first sensor. A shape of the glasses-type information display device is not limited to a general shape of glasses, an application, or a wearing portion. In addition, the glasses-type information display device may be a monocular type or a compound eye type, and the aspect in which the projected image is visually recognized with one eye has been described in the above-mentioned embodiment, but the projected image may be visually recognized with both eyes. A shape in which the left and right sides are connected like goggles may be used. In addition, it is not limited to devices wearing on a human head, like a so-called head-mounted display (for example, if a robot with the appearance of a dog simulates a function of a human, and the function of human eyes is achieved by a camera in the robot's knee, then the image processing device according to the embodiment of the present disclosure is mounted on the knee). Such an image processing device is also included in the technique of the present disclosure.

In addition, an aspect in which the AR glasses 10 comprises one camera 27 and one camera 27 captures the entire visual field of the user has been described in the above-mentioned embodiment. However, the camera comprised in the AR glasses 10 is not limited to this aspect. For example, an aspect comprising two cameras, a camera that images the real world 70 corresponding to the visual field of the right eye of the user and a camera that images the real world 70 corresponding to the visual field of the left eye of the user, may be used.

In addition, a case in which the projection image 74 is a still image has been described in the above-mentioned embodiment, but the projection image 74 may be a video.

In addition, a device other than the glasses-type information display device 1 may comprise some or all of the functions of the smartphone 12 of the above-mentioned embodiment. For example, the smartphone 12 may have a function of projecting the projection image 74 onto the light guide plate 24, and another device may have a function of the control device of the present disclosure.

In addition, in the above-mentioned embodiment, information corresponding to the types of the lens 22R for a right eye and the light guide plate 24 is exemplified as model information indicating the model of the AR glasses 10, but the model information indicating the model of the AR glasses 10 is not limited to these. For example, the information may correspond to any one of the lens 22R for a right eye or the light guide plate 24, or the information corresponding to the lens 22L for a left eye may be further used.

In addition, the following various processors can be used in the above-mentioned embodiment as the hardware structures of processing units such as the projection image acquisition unit 50, the captured image acquisition unit 51, the region-of-interest acquisition unit 52, the illuminance acquisition unit 53, the visibility controller 54, the projection image basic processing unit 57, the captured image basic processing unit 59, the display controller 60, and the recording controller 62, which perform various types of processing. The various processors include a programmable logic device (PLD) that is a processor of which the circuit configuration can be changed after manufacture, such as a field programmable gate array (FPGA), a dedicated electrical circuit that is a processor having circuit configuration dedicatedly designed to perform specific processing, such as an application specific integrated circuit (ASIC), and the like in addition to a CPU that is a general-purpose processor functioning as various processing units by executing software (program) as described above.

One processing unit may be formed of one of these various processors, or may be formed of a combination of two or more processors of the same type or different types (for example, a combination of a plurality of FPGAs or a combination of a CPU and an FPGA). In addition, a plurality of processing units may be formed of one processor.

As an example in which a plurality of processing units are formed of one processor, first, there is an aspect in which one processor is formed of a combination of one or more CPUs and software as typified by a computer, such as a client or a server, and functions as a plurality of processing units. Second, there is an aspect where a processor fulfilling the functions of the entire system, which includes a plurality of processing units, by one integrated circuit (IC) chip as typified by System On Chip (SoC) or the like is used. In this way, various processing units are formed using one or more of the above-mentioned various processors as hardware structures.

Furthermore, more specifically, electrical circuitry in which circuit elements, such as semiconductor elements, are combined can be used as the hardware structures of these various processors.

In addition, an aspect in which the control program 45 is stored (installed) in the storage unit 44 in advance has been described in each above-mentioned embodiment, but the present disclosure is not limited thereto. The control program 45 may be provided in a form where the control program 45 is recorded in recording mediums, such as a compact disc read only memory (CD-ROM), a digital versatile disc read only memory (DVD-ROM), and a universal serial bus (USB) memory. In addition, the control program 45 may be downloaded from an external device through a network.

In regard to the embodiment described above, the following supplementary notes will be further disclosed.

(Supplementary Note 1)

A control device comprising at least one processor, in which the processor acquires a region of interest of a user, performs, for at least one image of a real image visually recognized by the user through a transmission unit or a projected image projected onto the transmission unit and visually recognized by the user, a control to change visibility by the user based on a relationship between at least one of the real image or the projected image and the region of interest, by a visibility change unit that changes the visibility, and records the projected image in which the visibility is not changed by the visibility change unit.

(Supplementary Note 2)

The control device according to Supplementary Note 1, in which the processor performs a control to make visibility of one image of the real image and the projected image, which is the region of interest, relatively higher than visibility of the other image, which is not the region of interest.

(Supplementary Note 3)

The control device according to Supplementary Note 1 or 2, in which the processor acquires a captured image that represents the real image, and records the captured image simulating the real image in a state in which the visibility is not changed by the visibility change unit.

(Supplementary Note 4)

The control device according to any one of Supplementary Notes 1 to 3, in which the processor adds region-of-interest information related to the region of interest to the captured image and a projection image representing the projected image.

(Supplementary Note 5)

The control device according to any one of Supplementary Notes 1 to 4, in which the processor acquires the region of interest detected based on a visual line of the user.

(Supplementary Note 6)

The control device according to any one of Supplementary Notes 1 to 4, in which the region of interest is a region corresponding to a central visual field of the user.

(Supplementary Note 7)

The control device according to any one of Supplementary Notes 1 to 4, in which the region of interest is a region where a gaze target of the user exists.

(Supplementary Note 8)

A glasses-type information display device comprising a transmission unit, a visibility change unit, and the control device according to any one of Supplementary Notes 1 to 7.

(Supplementary Note 9)

A control method comprising acquiring a region of interest of a user, performing, for at least one image of a real image visually recognized by the user through a transmission unit or a projected image projected onto the transmission unit and visually recognized by the user, a control to change visibility by the user based on a relationship between at least one of the real image or the projected image and the region of interest, by a visibility change unit that changes the visibility, and recording the projected image in which the visibility is not changed by the visibility change unit.

(Supplementary Note 10)

A control program for causing a processor to execute a process comprising acquiring a region of interest of a user, performing, for at least one image of a real image visually recognized by the user through a transmission unit or a projected image projected onto the transmission unit and visually recognized by the user, a control to change visibility by the user based on a relationship between at least one of the real image or the projected image and the region of interest, by a visibility change unit that changes the visibility, and recording the projected image in which the visibility is not changed by the visibility change unit.

What is claimed is:

1. A control device for a glasses-type information display device including at least one lens that optically transmits a real light from a real world visually recognized by the user, and a light guide plate that guides and projects onto the at least one lens a projected light emitted by a light emitter visually recognized by the user, and at least one processor,
   wherein the processor is configured to:
   acquire a region of interest of a user; and
   perform a control of the light emitter and a light shielding rate of the at least one lens to change visibility by the user based on a relationship between at least one of the real light or the projected light and the region of interest by,
   (A) determining whether or not the region of interest coincides with a real light region of the at least one lens transmitting the real light,
   (B) if the region of interest does not coincide with the real light region, controlling the light emitter to increase a brightness of the projected light in order to increase the visibility of the projected light,
   (C) if the region of interest coincides with the real light region, determining if an illuminance of the real world detected by an illuminance meter is greater than or equal to a threshold value,
   (C.1) if the illuminance is greater than or equal to the threshold value, increasing the visibility of the real light by increasing the light shielding rate of the at least one lens, and
   (C.2) if the illuminance is less than the threshold value, controlling the light emitter to decrease the brightness of the projected light in order to relatively increase the visibility of the real light; and
   record a projected image data representing an image corresponding to the projected light in which the visibility is not changed.

2. The control device according to claim 1,
   wherein the processor is further configured to perform a control to make visibility of one image of the real image and the projected image, which is the region of interest, relatively higher than visibility of the other image, which is not the region of interest.

3. A glasses-type information display device comprising the control device according to claim 2.

4. The control device according to claim 1,
   wherein the processor is further configured to:
   acquire a captured image that represents the real image; and
   record the captured image simulating the real image in a state in which the visibility is not changed.

5. The control device according to claim 4,
   wherein the processor is further configured to add region-of-interest information related to the region of interest to the captured image and a projection image representing the projected image.

6. A glasses-type information display device comprising the control device according to claim 5.

7. A glasses-type information display device comprising the control device according to claim 4.

8. The control device according to claim 1, wherein the processor is further configured to acquire the region of interest detected based on a visual line of the user.

9. The control device according to claim 8, wherein the region of interest is a region corresponding to a central visual field of the user.

10. A glasses-type information display device comprising the control device according to claim 9.

11. A glasses-type information display device comprising the control device according to claim 8.

12. The control device according to claim 1, wherein the region of interest is a region where a gaze target of the user exists.

13. A glasses-type information display device comprising the control device according to claim 12.

14. A glasses-type information display device comprising the control device according to claim 1.

15. A control method for a glasses-type information display device including at least one lens that optically transmits a real light from a real world visually recognized by the user, and a light guide plate that guides and projects onto the at least one lens a projected light emitted by a light emitter visually recognized by the user, the method comprising:

acquiring a region of interest of a user;

performing, a control of the light emitter and a light shielding rate of the at least one lens to change visibility by the user based on a relationship between at least one of the real light or the projected light and the region of interest by, determining following conditions (A), (B), and (C):

(A) the region of interest does not coincide with a real light region on the at least one lens transmitting the real light;

(B) the region of interest coincides with the real light region and an illuminance of the real world detected by an illuminance meter is greater than or equal to a threshold value; and (C) the region of interest coincides with the real light region and the illuminance of the real world detected by the illuminance meter is less than the threshold value, wherein if the condition (A) is satisfied, controlling the light emitter to increase a brightness of the projected light in order to increase the visibility of the projected light, if the condition (B) is satisfied increasing the visibility of the real light by increasing the light shielding rate of the at least one lens, and if the condition (C) is satisfied, controlling the light emitter to decrease the brightness of the projected light in order to relatively increase the visibility of the real light, and, recording a projected image data representing an image corresponding to the projected light in which the visibility is not changed.

16. A non-transitory computer-readable storage medium storing a control program for causing a processor to execute a process for a glasses-type information display device including at least one lens that optically transmits a real light from a real world visually recognized by the user, and a light guide plate that guides and to projects onto the at least one lens a projected light emitted by a light emitter visually recognized by the user, the process comprising:

acquiring a region of interest of a user;

performing a control of the light emitter and a light shielding rate of the at least one lens to change visibility by the user based on a relationship between at least one of the real light or the projected light and the region of interest by, (A) determining whether or not the region of interest coincides with a real light region on the at least one lens transmitting the real light, (B) if the region of interest does not coincide with the real light region, controlling the light emitter to increase a brightness of the projected light in order to increase the visibility of the projected light, (C) if the region of interest coincides with the real light region, determining if an illuminance of the real world detected by an illuminance meter is greater than or equal to a threshold value, (C.1) if the illuminance is greater than or equal to the threshold value, increasing the visibility of the real light by increasing the light shielding rate of the at least one lens; and (C.2) if the illuminance is less than the threshold value, controlling the light emitter to decrease the brightness of the projected light in order to relatively increase the visibility of the real light; and recording a projected image data representing an image corresponding to the projected light in which the visibility is not changed.

* * * * *